United States Patent [19]

Bok et al.

[11] Patent Number: 4,469,204

[45] Date of Patent: Sep. 4, 1984

[54] BRAKE APPARATUS

[75] Inventors: Lowell D. Bok, Anna; Bradley J. Baden, Troy, both of Ohio

[73] Assignee: The B. F. Goodrich Company, New York, N.Y.

[21] Appl. No.: 461,818

[22] Filed: Jan. 28, 1983

[51] Int. Cl.³ .............................................. F16D 65/10
[52] U.S. Cl. ........................ 188/218 XL; 188/251 A; 192/107 R
[58] Field of Search ........... 188/73.2, 218 XL, 251 A, 188/251 R, 250 B; 192/107 R, 70.2

[56] References Cited

U.S. PATENT DOCUMENTS

| | | | |
|---|---|---|---|
| 3,605,967 | 9/1971 | Warren et al. | 188/218 XL |
| 3,934,686 | 1/1976 | Stimson et al. | 188/218 XL |
| 4,083,434 | 4/1978 | Pinter | 188/218 XL |
| 4,249,642 | 2/1981 | Anderson et al. | 188/218 XL |

FOREIGN PATENT DOCUMENTS

WO80/00735  1/1980  PCT Int'l Appl. .......... 188/218 XL

Primary Examiner—Bruce H. Stoner, Jr.
Assistant Examiner—Alvin E. Oberley
Attorney, Agent, or Firm—Joseph Januszkiewicz

[57] ABSTRACT

A friction brake disc assembly having a plurality of axially aligned annular shaped rotor discs splined for axial movement interleaved with annular stator discs which are splined for axial movement along a mating key member or members that are fixedly secured to a torque tube. The discs have a plurality of circumferentially spaced slots along the periphery, with inserts therein to transfer the load to the discs. The inserts have structural portions thereof extending along the outer annular surface of the discs for engagement by clips to retain the inserts within the slots. The clips are secured to spaced locations along the periphery of the discs to minimize the concentrations of any load transferred from the inserts to the discs.

6 Claims, 3 Drawing Figures

BRAKE APPARATUS

BACKGROUND OF THE INVENTION

This invention relates to friction braking systems and more particularly to aircraft friction discs with reinforced peripheral slots for use in multiple disc brakes.

In brake assemblies which employ a plurality of brake discs alternately splined to the wheel and axle of an aircraft, it is important to provide specially constructed drive means to reinforce peripheral slots in the discs to relieve the severe stressing that otherwise would rapidly deteriorate the periphery of the discs. When disc brakes were constructed of steel, the discs were able to withstand the shearing and compressive forces exerted thereon between the slots and the torque transmitting members because of their physical properties. With the replacement of the steel discs with carbon composition discs it was important to provide reinforcing inserts at the peripheral slots since the carbon composites have less strength than steel. The inserts transmit the forces to the carbon discs, over a larger area reducing the contact stresses which increases the load capability of the carbon composite discs.

Some friction discs with reinforced inserts at the slots do not adequately transfer the load. In some structures the load is transmitted via radially disposed pins to the carbon discs. These discs require precise machining for the placement of the radial holes while simultaneously weakening the discs due to the removal of substantial material along the entire radial wall. In some structures the inserts for the peripheral reinforced slots transmit the forces to the insert rivets and then to the openings in the disc through which the rivets extend. These openings accept all of the discs loading and are therefore subject to undesirable very high stress concentrations. The present invention utilizes an insert at the peripheral slots that engages the carbon disc and drives on the rotating member or transfers the stress to the stationary member without deleterious effects on the carbon composite materials. The insert has a pair of opposed faces which frictional contact the opposite walls of the slots to distribute the load. The insert design uses a channel to retain the inserts in position within the slot. Such structure eliminates peeling or fraying of the carbon composite heat sink material while also taking up some of the stresses due to misalignment in the wheel and brake. The structure of the insert and clip provides for a large bearing area in the carbon composite and minimizes the weight required to obtain the strength to handle the side loads in case of some misalignment. The construction permits the insert to float freely in the slot of the carbon disc thereby eliminating the tension loading of the attaching rivets.

SUMMARY OF THE INVENTION

The present invention contemplates a friction brake disc type assembly with the discs having flat annular surfaces and a plurality of circumferentially spaced slots along the outer periphery of the rotating discs and slots along the inner periphery of a stationery disc. An insert is positioned within each slot for contact with either the spline of a torque device in the case of the rotating disc or with key members that are fixedly secured to a stationary torque tube. The inserts are U-shaped with each leg having a pair of side portions that extend away from the slots along the flat annular surface of the disc. Clips are fixedly secured to the discs and retain the inserts within their slots permitting a slight degree of movement because of a clearance space between the clips and the inserts.

DESCRIPTION OF THE PREFERRED EMBODIMENT

Figure 1:
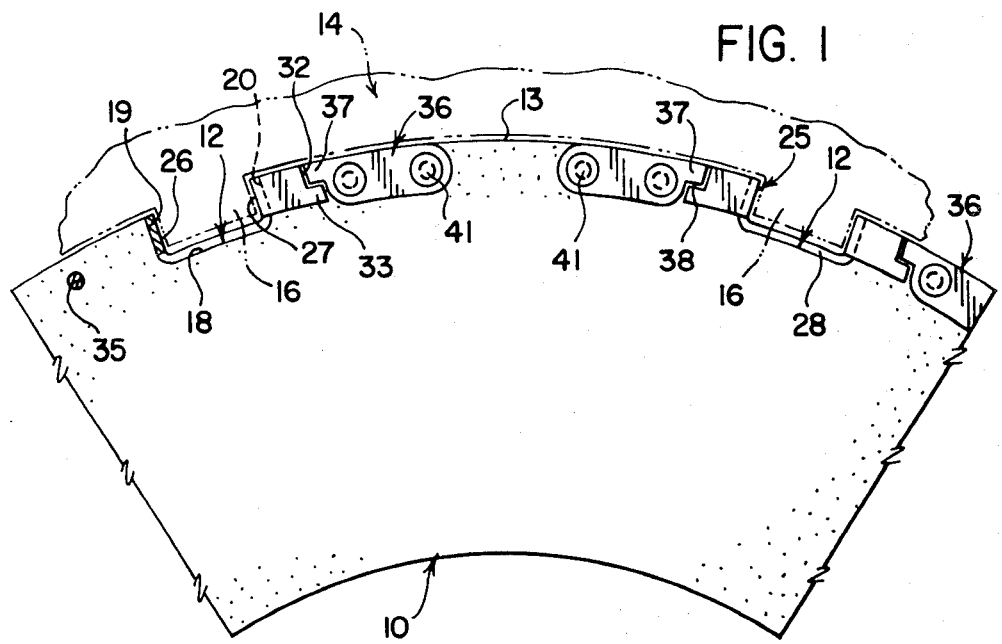
FIG. 1 is a fragmentary side elevational view of a brake disc assembly with a key slot and insert secured to the respective peripheral slots by clips.
Figure 2:
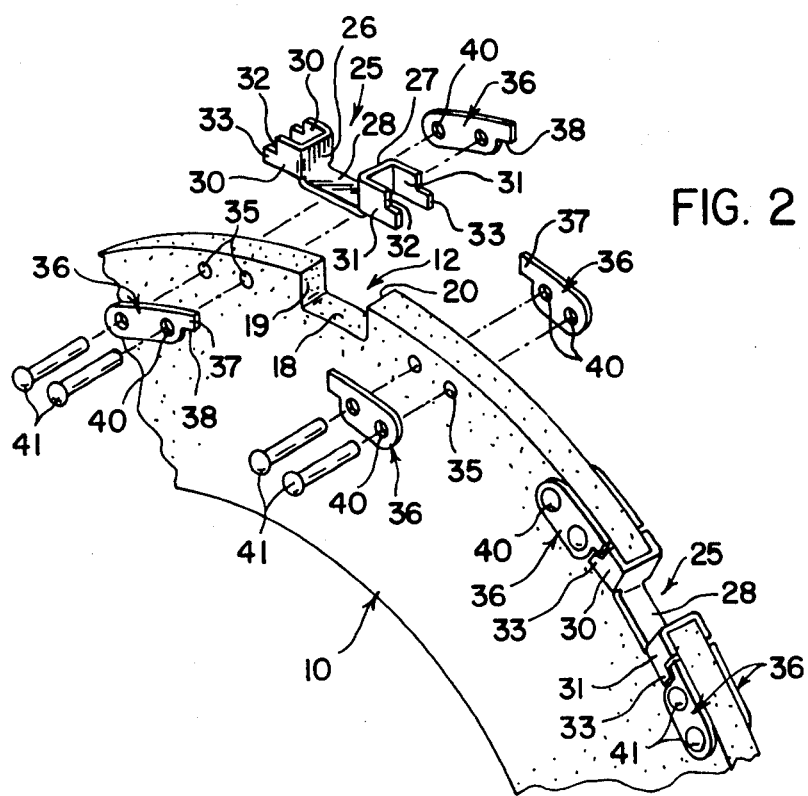
FIG. 2 is an exploded perspective view of the insert and clip in relation to a perspective view of a fragmentary portion of a rotor brake disc.

Referring to the drawings, wherein like reference numerals designate like or corresponding parts throughout the several views, there is shown in FIG. 1 a friction brake disc 10 in the form of a rotor of a multiple disc aircraft brake. Although only a portion of one rotor disc is shown, it is understood that multiple discs refers to the plurality of axially spaced-apart annular rotor discs which are suitably splined for axial movement along a mating key or spline that is part of the rotating wheel. The plurality of annular rotors are interleaved with annular stator discs which in turn are suitably splined for axial movement along a mating key member (or members) that is fixedly secured to a torque tube not shown. Disc 10 is an annular member having flat annular wall surfaces with an inner and an outer periphery. As seen in FIGS. 1 and 2, disc 10 has a plurality of circumferentially spaced slots 12 along its outer periphery 13.

The disc 10 is fabricated from a carbon material such as bulk graphite or carbon fabric composite. The discs 10 can be molded from chopped fibers of cellulose or other carbonizable materials and bonded or densified by a CVD process or by a resin later also to be carbonized, or can be molded from powders of graphite (or other forms of carbon) and densified by CVD process or by a carbonizable resin. The processing is done in a protective atmosphere. The disc 10 can be made by laying up flat sheets of cellulosic material and bonded or densified by CVD process or by impregnating with a carbonizable resin and processed at elevated temperatures. The processes for making the carbon discs are well known in the art and therefore will not be described herein.

A torque device 14 (shown in phantom lines in FIG. 1) is located adjacent to the outer periphery of the discs 10 (only a portion of one shown in FIG. 1). Torque device 14 has a plurality of splines, ribs or disc engaging members 16 projecting into slots 12 to provide a means for applying a load or force on the disc 10 by its engagement with slot 12. Slot 12 has a bottom surface 18, and two radially extending planar side walls 19 and 20.

A metal insert 25 (FIG. 2) is located within each slot 12 to provide a reinforcement means for driving contact from the splines 16 of torque device 14. Each insert has a generally U-shaped configuration, with a pair of end sections 26–27 which are adapted to engage the planar side walls 19 and 20 of slot 12 such that the forces applied to the end sections 26–27 transfer the forces to the planar side walls 19 and 20. The end sections 26 and 27 are interconnected by a bridging section 28. The bottom surface of the bridging section 28 is in abutting contact with the bottom surface 18 of slot 12. The respective end sections 26 and 27 have a pair of arms 30 and 31 that extend outwardly away from the bridging section 28. Each of the arms 30 and 31 are notched at its upper outermost corner thereby presenting a shoulder 32 and an abutment 33. The pairs of arms 30 and 31 extend in opposite directions and are substantially parallel and lightly contact the outer peripheral annular surface of disc 10.

Each pair of arms 30 and 31 straddle the periphery 13 of the disc. The outer periphery of disc 10 contains a pair of bores 35 to either side of slot 12. Since the pairs of arms 30 and 31 of insert 25 extend along the periphery 13 of the disc 10, the pairs of bores 35 are located along the periphery but beyond the respective edges of the arms 30 and 31.

The inserts 25 are retained within their respective slots via clips 36. Each clip 36 is an elongated member with a recessed or reduced end defining an abutment 37 which forms a shoulder which can frictionally abut shoulder 32 of insert 25. By reducing the width of clip 36 adjacent abutment 37, a recess 38 is formed such as to receive the abutment 33 of insert 25, while the abutment 37 enters the notched upper outermost corner of the adjacent arms 30 or 31 so that the abutment 37 can frictionally abut the shoulder 32 of such arms. Each clip 36 has a pair of openings 40 which are spaced the same distance as the pairs of bores 35 along the periphery of disc 10. On aligning the openings 40 with bores 35, the clips 36 can be rigidly secured to the periphery of disc 10 by rivets 41 extending through the respective openings and bores.

In multiple disc brakes, the splines 16 of torque device 14 extends into the slots 12 of the axially aligned rotor brake discs 10. The respective slots 12 receive the inserts 25 such that the respective clips 36 to either side of any insert 25 will retain the insert 25 within the slot since the respective abutments 37 of clip 36 overlie the abutment 33 of insert 25. The shoulder 32 formed by the recess in the arms 30–31 of insert 25 thus can abuttingly contact the surface or edge of the abutment 37 of clip 36. This design permits the insert 25 to float freely in the slot 12 of the carbon disc 10 eliminating any tension thereon that otherwise would occur if insert 25 were firmly riveted to the disc 10. By permitting the floating of insert 25, the respective planar surfaces of the end sections 26 or 27 will fully contact the side walls 19 and 20 of the slot 12 in disc 10.

Figure 3:
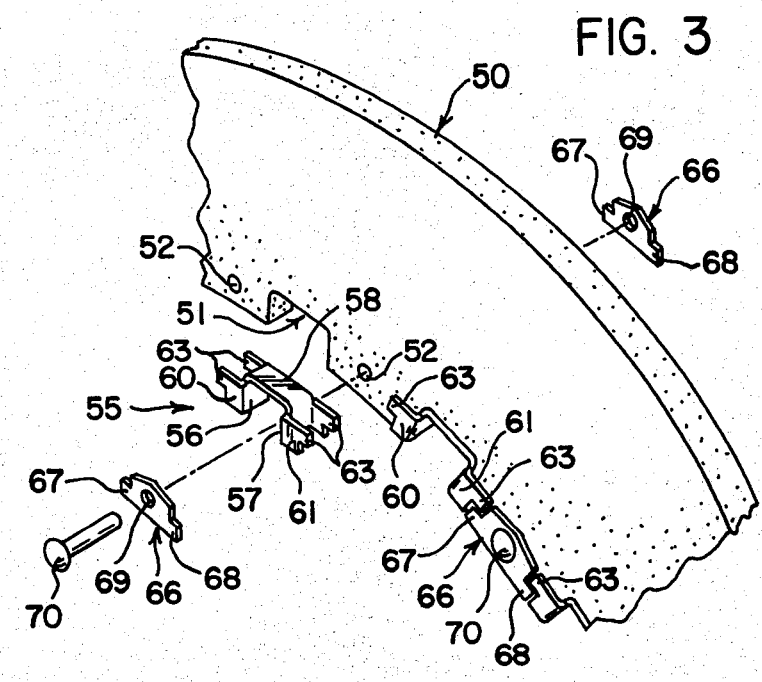
FIG. 3 is an exploded perspective view of the insert and cap in relation to a perspective view of a fragmentary portion of a stationary brake disc.

Stator discs can also be provided with similar torque-transmitting inserts in a manner similar to those used in the rotor disc 10 described above. FIG. 3 discloses part of an annular surface of a stator brake disc 50 having a plurality of slots 51 along the inner periphery thereof. The stator discs are suitably splined for axial movement along a mating key member that is fixedly secured to a stationary torque tube not shown. Slot 51 is similar to slot 12 of disc 10 in having a bottom surface and two oppositely disposed radially extending wall surfaces. The stator disc 50 has a plurality of circumferentially spaced bores 52 located along the inner periphery preferably half way between the respective slots 51.

An insert 55 identical to insert 25 described above is located within each slot 51. Insert 55 has a U-shaped configuration with spaced legs or end sections 56–57, which sections are adapted to engage the planar side walls of slot 51 such that the forces applied to the end sections 56–57 are transferred to their respective side walls thereof. The end sections 56 and 57 are interconnected by a bridging section 58. As viewed in FIG. 3, the top surface of bridging section 58 is in contact with the bottom surface of slot 51. The respective end sections 56 and 57 have pairs of arms 60 and 61 that extend outwardly away from the bridging section 58. Each of the arms 60 and 61 are recessed or notched at their lower outermost corners (as viewed in FIG. 3) to thereby present an abutment 63.

The pairs of arms 60 and 61 extend in opposite directions and are substantially parallel and lightly contact the outer peripheral annular surface of disc 50. Each pair of arms 60 and 61 straddle the inner periphery of disc 50.

The inserts 55 are retained within their respective slots 51 via clips 66. Each clip 66 is an elongated flat member with reduced ends defining a pair of square shaped aoutments 67 and 68 which form a shoulder which can frictionally engage a recessed or notched portion of the respective arms 60 and 61. The clip 66 has a central bore 69 which when aligned with the bore 52 in the inner periphery of disc 50 can receive a rivet 70 which fastens the clip to the disc 50. In this fastened position of clip 66, the pair of abutments 67 and 68 engage the recessed or notched portions of the respective arms 60 and 61 to thereby retain the insert 55 within the slots. A single clip in this instance can engage and retain opposite portions of two adjacent inserts 55 as seen in FIG. 3. Clips 66 are mounted on both sides of the flat annular surface of the discs 50.

In the operation of the discs 10 and 50 in multiple disc brakes, the splines 16 of torque device 14 extends into slots 12 of the axially aligned rotor brake discs 10. The axially aligned stators 50 interleaved between the annular axially aligned and axially spaced rotor discs 10 are suitably splined for axial movement along a mating key member that is fixedly secured to a stationary torque tube and is subject to being moved axially by suitable actuators such as a piston. When the brakes are applied, the rotor discs 10 and the stator discs 50 are axially squeezed together. The frictional forces between the faces of the rotor discs and the stator discs creates a load at the slots 12 and 51 as they bear against the splines 16 and the mating key members of the stationary brake discs 50. This load is transmitted to the sides or legs of the U-shaped inserts 25 and 55, which via their flat faces exert a force directly on the appropriate walls of slots 12 and 51. No torque load is transmitted from the inserts 12 or 55 to the clips or their rivets but rather distributed evenly over the flat wall surfaces of the slots of the carbon discs. When the torque load is transmitted from the inserts to the faces of the slots in the discs, the inserts seat firmly against the carbon discs. The horizontal loads due to misalignment in the wheel and brake are taken out on the side of the carbon disc. The channel clips 36 and 66 allow for sufficient bearing area and minimizes the weight required to obtain the strength to handle the side loads due to misalignment.

Various modifications are contemplated and may obviously be resorted to by those skilled in the art without departing from the described inventions as hereinafter defined by the appended claims, as only a preferred embodiment thereof has been defined.

We claim:

1. In a friction brake disc having a pair of annular flat wall surfaces, an inner peripheral wall surface, and an outer peripheral wall surface; said disc having a plurality of circumferentially spaced slots along the outer periphery extending in said outer peripheral wall surface and disposed for engagement by a spline of a torque device; each of said slots having two generally radially extending wall portions and a bottom surface extending between and interconnecting said wall portions; an insert located within each of said slots for reinforcing said slots; each of said inserts having a general U-shaped configuration with two spaced legs and an interconnecting bridging section; each of said legs having a pair of spaced parallel arm members extending in a direction opposite to and away from said bridging section; said arm members laying along the outer peripheral wall surface of said disc; the terminal ends of said arm members having a recessed portion along the outermost radial portion thereof defining an abutment (33) along the innermost radial portion thereof; the outer peripheral wall surface of said disc adjacent each of said arm members having a clip secured to said disc; each clip being recessed on one end along the innermost radial portion thereof defining an abutment on its outermost radial portion for extension into said recessed portion of said arm members to retain said inserts within said slots.

2. A friction disc as set forth in claim 1 wherein each of said clip are secured to said disc by rivet attached to said disc at locations spaced from said slots.

3. A friction brake disc as set forth in claim 2 wherein said clips have a clearance space between their respective abutments and adjacent recesses of said arm members.

4. In a friction brake disc having a pair of annular flat wall surfaces, an inner peripheral wall surface, and an outer peripheral wall surface; said disc having a plurality of circumferentially spaced slots along one of said periphery wall surfaces for engagement by a spline of a torque device; each of said slots having two generally radially extending wall portions and a bottom surface extending between and interconnecting said wall portions; an insert located within each of said slots for reinforcing said slots; each of said inserts having a general U-shaped configuration with two spaced legs and an interconnecting bridging section; each of said legs having an intermediate portion and two side portions; said intermediate portion adapted to abuttingly contact one of said two radially extending wall portions; said side portions being parallel to each other and adapted to abuttingly engage a portion of said annular flat wall surfaces; each of said side portions being recessed on their terminal ends adjacent said one peripheral wall surfaces; a plurality of circumferentially spaced clips along said one peripheral wall surface securely fastened to said disc; and each of said clips having at least one end projecting into an adjacent recess on one of said side portions of said legs to retain said inserts.

5. In a friction brake disc as set forth in claim 4 wherein a clearance space is provided between each abutment on said clips with an adjacent one of said recesses of said legs side portions to permit movement of said insert within said slot to seat against said wall portions of said slots.

6. In a friction brake disc as set forth in claim 5 wherein each of said clips have a pair of spaced end portions with abutments thereon projecting into adjacent recesses on a pair of inserts that are mounted in slots adjacent to each other.

* * * * *